United States Patent
Yamaguchi et al.

(10) Patent No.: US 9,225,242 B2
(45) Date of Patent: Dec. 29, 2015

(54) ELECTRONIC CONTROL DEVICE INCLUDING VOLTAGE CONVERTER

(71) Applicant: DENSO CORPORATION, Kariya, Aichi-pref. (JP)

(72) Inventors: Hiroshi Yamaguchi, Obu (JP); Toru Itabashi, Anjo (JP); Kenichi Yashiro, Gifu (JP); Yuki Mikami, Kariya (JP)

(73) Assignee: DENSO CORPORATION, Kariya (JP)

( * ) Notice: Subject to any disclaimer, the term of this patent is extended or adjusted under 35 U.S.C. 154(b) by 93 days.

(21) Appl. No.: 14/096,434

(22) Filed: Dec. 4, 2013

(65) Prior Publication Data
US 2014/0176105 A1    Jun. 26, 2014

(30) Foreign Application Priority Data
Dec. 25, 2012 (JP) .................. 2012-280983

(51) Int. Cl.
*H02M 3/156* (2006.01)
*H02M 1/08* (2006.01)
*H02M 1/00* (2007.01)

(52) U.S. Cl.
CPC ............. *H02M 3/156* (2013.01); *H02M 1/08* (2013.01); *H02M 2001/0029* (2013.01)

(58) Field of Classification Search
CPC ............ H02M 2001/0029; H02M 3/156; H02M 1/36; H02M 7/517
USPC .......... 323/282, 284, 285, 901; 327/380, 381; 363/49
See application file for complete search history.

(56) References Cited

U.S. PATENT DOCUMENTS

2010/0079649 A1    4/2010    Ayraud
2012/0062190 A1*   3/2012    Haiplik et al. ........... 323/271

FOREIGN PATENT DOCUMENTS

| JP | 2008-029059 A | 2/2008 |
| JP | 2009-213313 A | 9/2009 |
| JP | 2011-142815 A | 7/2011 |
| JP | 2012-100400 A | 5/2012 |

OTHER PUBLICATIONS

Office Action mailed Jan. 6, 2015 issued in corresponding JP patent application No. 2012-280983 (and English translation).

* cited by examiner

*Primary Examiner* — Gary L Laxton
(74) *Attorney, Agent, or Firm* — Posz Law Group, PLC

(57) ABSTRACT

An electronic control device includes a turn-on restriction section capable of performing a restriction operation to restrict a turn-on speed of a switching element. The turn-on restriction section includes a comparator. The comparator receives a voltage of a main terminal of the switching element connected to a smoothing circuit and determines whether the voltage of the main terminal of the switching element reaches a threshold voltage. The turn-on restriction section performs the restriction operation for a predetermined time from a start of a turn-on period in which the switching element is turned on. The turn-on restriction section stops the restriction operation after the predetermined time has elapsed. The predetermined time is set to a time from the start of the turn-on period until the voltage of the main terminal of the switching element reaches the threshold voltage.

8 Claims, 12 Drawing Sheets

| CONTROL SIGNAL Sa | OUTPUT SIGNAL OF COMPARATOR 24 | RESTRICTION CONTROL SIGNAL Sb |
|---|---|---|
| LOW | LOW | LOW |
| HIGH | LOW | HIGH |
| LOW | HIGH | LOW |
| HIGH | HIGH | LOW |

| CONTROL SIGNAL Sa | OUTPUT SIGNAL OF COMPARATOR 24 | RESTRICTION CONTROL SIGNAL Sb |
|---|---|---|
| LOW | LOW | HIGH |
| HIGH | LOW | HIGH |
| LOW | HIGH | HIGH |
| HIGH | HIGH | LOW |

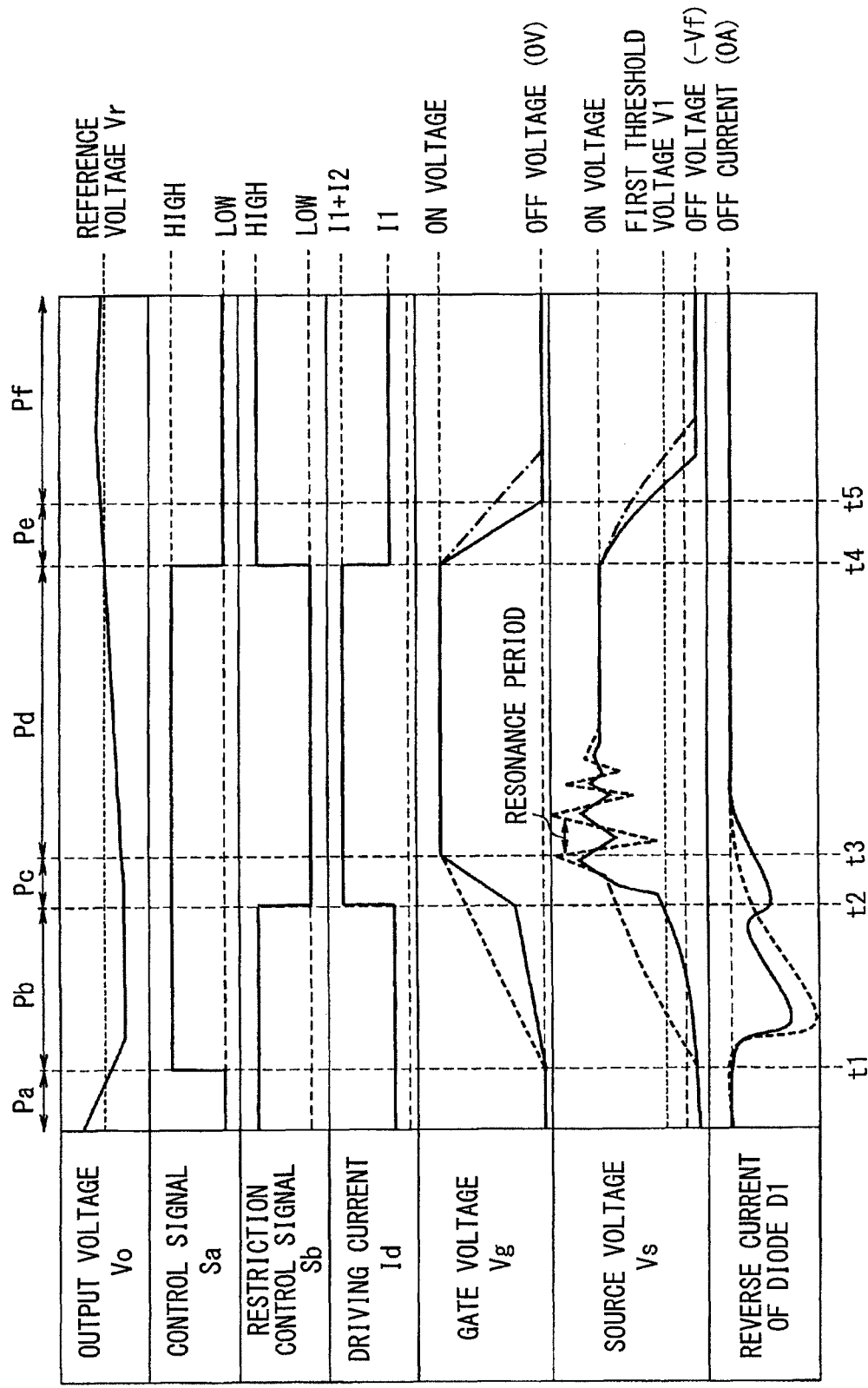

ELECTRONIC CONTROL DEVICE INCLUDING VOLTAGE CONVERTER

CROSS REFERENCE TO RELATED APPLICATIONS

The present application is based on and claims priority to Japanese Patent Application No. 2012-280983 filed on Dec. 25, 2012, the contents of which are incorporated in their entirety herein by reference.

TECHNICAL FIELD

The present disclosure relates to an electronic control device including a voltage converter.

BACKGROUND

In a switching power supply as a voltage converter, problems such as generation of heat and noise are exposed due to tendency of increasing in electric current and increasing in switching frequency. As measures against noise generated due to switching (switching noise), the following method is known. In a known method, an input voltage (e.g., a gate voltage of a MOS transistor) of a switching element is decreased, and a voltage change amount of an output voltage of the switching element (e.g., a source voltage of the MOS transistor) is decreased to restrict switching noise. However, in the above-described method, a rise time (turn-on period) of the switching element increases. Thus, a power consumption and a heat generation amount increase.

Thus, a method of reducing switching noise while restricting generation of heat is required. JP-A-2011-142815 discloses a technique in which an input voltage of a switching element is controlled with fixing a rise time so as to change the voltage change amount during the turn-on period. Specifically, when the switching element is turned on, the voltage change amount is large, that is, the output voltage drastically increases until the output voltage reaches a predetermined threshold value. After the output voltage of the switching element reaches the threshold value, the voltage change amount is small, that is, the output voltage gently increases. By the above-described technique, the output voltage gently increases after the output voltage reaches the threshold value. Thus, the voltage change amount at the end of turning-on decreases, generation of overshoot can be restricted, and noise can be reduced.

In the switching power supply, switching noise is caused mainly by the following reasons rather than the overshoot. In a boost (step-up) switching power supply, a main terminal of a high-side switching element adjacent to a smoothing circuit (e.g., a source of a MOS transistor) is connected to a semiconductor element, such as a rectifier element forming the smoothing circuit or a low-side switching element (in a case of synchronizing rectification). In general, the semiconductor element includes a parasitic capacitance component (parasitic capacitance, stray capacitance). Thus, at a moment when the high-side switching element is turned on, a reverse current flows through the capacitance component, and the reverse current and a parasitic LC component in a circuit resonate. Accordingly, large switching noise is generated.

The above-described conventional technique does not consider reducing the switching noise generated due to the reverse current. Furthermore, the above-described conventional technique may increase the switching noise generated due to the reverse current. The reverse current is proportional to the capacitance value of the parasitic capacitance component and the voltage change amount of the output voltage of the switching element. Thus, when the output voltage drastically increases until the output voltage reaches the threshold value as the above-described conventional technique, because the voltage change amount increases, the reverse current increases and the switching noise due the reverse current further increases.

In other words, the above-described conventional technique increases the switching noise due to the reverse current that is a main factor of generation of switching noise in consequence of control for restricting overshoot that is not the main factor of generation of switching noise. Thus, when all the various factors considered together, the above-described conventional technique may increase switching noise rather than reduce switching noise.

SUMMARY

It is an object of the present disclosure to provide an electronic control device including a voltage converter that can restrict generation of switching noise due to reverse current at turning-on of a switching element.

An electronic control device according to an aspect of the present disclosure includes a voltage converter and a control processor operating by receiving an electric power supplied from the voltage converter. The voltage converter includes a switching element, a smoothing circuit, a voltage control circuit, a driving circuit, and a turn-on restriction section. The switching element switches a direct-current power supplied from a direct-current power source. The smoothing circuit smoothes the direct-current power switched by the switching element and outputs a smoothed direct-current power. The voltage control circuit generates a control signal based on the smoothed direct-current power output from the smoothing circuit. The driving circuit drives the switching element based on the control signal. The turn-on restriction section is capable of performing a restriction operation to restrict a turn-on speed of the switching element.

The turn-on restriction section includes a comparator. The comparator receives a voltage of a main terminal of the switching element connected to the smoothing circuit and determines whether the voltage of the main terminal of the switching element reaches a threshold voltage. The turn-on restriction section performs the restriction operation for a predetermined time after a start of a turn-on period in which the switching element is turned on. The turn-on restriction section stops the restriction operation after the predetermined time has elapsed. The predetermined time is set to a time from the start of the turn-on period until the voltage of the main terminal of the switching element reaches the threshold voltage.

The voltage converter in the electronic control device can restrict generation of switching noise due to reverse current at turning-on of the switching element while restricting increase of power consumption and heat generation amount.

BRIEF DESCRIPTION OF THE DRAWINGS

Additional objects and advantages of the present disclosure will be more readily apparent from the following detailed description when taken together with the accompanying drawings. In the drawings:

FIG. 9 is a timing diagram showing an operation of a power supply circuit according to the second embodiment;

DETAILED DESCRIPTION

Figure 1:
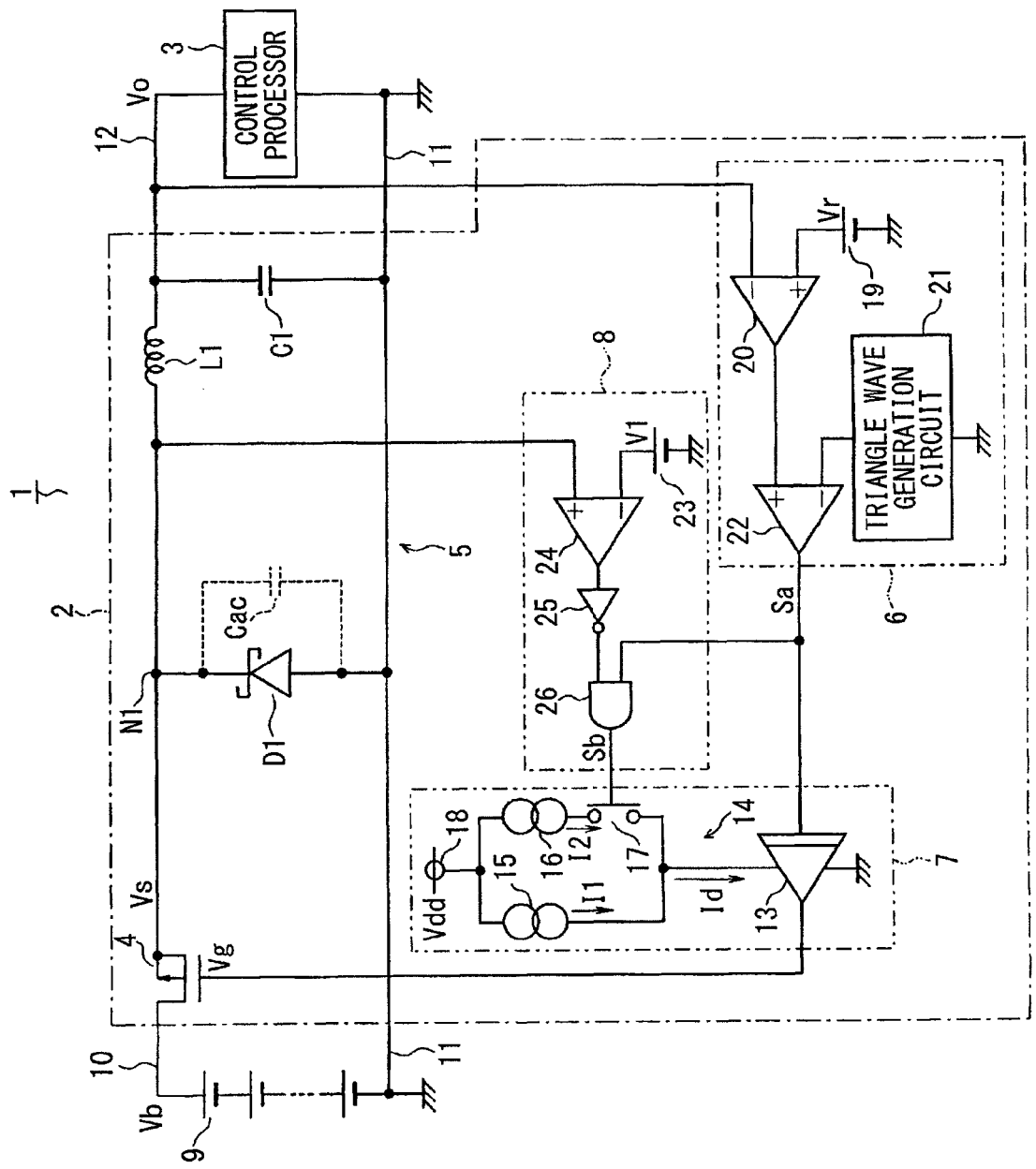
FIG. 1 is a diagram showing an electronic control device according to a first embodiment of the present disclosure.

Exemplary embodiments of the present disclosure will be described with reference to the drawings. In the following embodiments, components having similar structures are denoted by the same reference numeral and an explanation will be omitted.

First Embodiment

An electronic control device 1 for a vehicle according to a first embodiment of the present disclosure will be described with reference to FIG. 1 through FIG. 6. The electronic control device 1 is mounted on a vehicle. The electronic control device 1 includes a power supply circuit 2 and a control processor 3. The power supply circuit 2 is an example of a voltage converter. The control processor 3 is an example of a load circuit. The power supply circuit 2 is a buck (step-down) switching power supply. The power supply circuit 2 supplies electric power to the control processor 3. The control processor 3 operates by receiving the electric power from the power supply circuit 2 and executes predetermined control and processes.

The power supply circuit 2 includes a transistor 4, a smoothing circuit 5, a voltage control circuit 6, a driving circuit 7, and a restriction operation control circuit 8. The power supply circuit 2 controls the transistor 4 with pulse width modulation control so as to decrease voltage of a direct-current power supplied from a battery 9 mounted in the vehicle. The battery 9 is an example of a direct-current power source. In the present embodiment, elements forming the power supply circuit 2 except for a part (inductor L1 and a capacitor C1 described later) of elements forming the smoothing circuit 5 are formed of a semiconductor integrated circuit.

The transistor 4 is an N-channel type MOS transistor. The transistor 4 is an example of a switching element. The transistor 4 is disposed on a power supply path from the battery 9 to the control processor 3. A drain of the transistor 4 is connected to an input power supply line 10. Between the input power supply line 10 and a ground line 11, a battery voltage Vb is applied from the battery 9. The ground line 11 is an example of a reference power supply line. A source of the transistor 4 is connected to a node N1. The source of the transistor 4 is an example of a main terminal connected to the smoothing circuit 5. A gate of the transistor 4 is supplied with a driving signal from the driving circuit 7. The gate of the transistor 4 is an example of a control terminal. The transistor 4 converts the battery voltage Vb to a pulsed voltage and outputs the pulsed voltage by a switching operation The smoothing circuit 5 rectifies and smoothes the pulsed voltage output from the transistor 4. The smoothing circuit 5 includes a diode D1 for rectification, an inductor L1 for smoothing, and a capacitor C1 for smoothing. The diode D1 is a Schottky barrier diode. The diode D1 is connected between the node N1 and the ground line 11 such that an anode is connected to the ground line. In general, a diode has a parasitic capacitance. In FIG. 1, a parasitic capacitance Cac between the anode and the cathode of the D1 is shown by a dashed line. The inductor L1 is connected between the node N1 and an output power supply line 12. The capacitor C1 is connected between the output power supply line 12 and the ground line 11. The control processor 3 is supplied with an output voltage Vo via the output power supply line 12 and the ground line 11.

The driving circuit 7 turns on or off the transistor 4 based on a control signal Sa (duty signal) supplied from the voltage control circuit 6. Specifically, the driving circuit 7 turns on the transistor 4 when the control signal Sa is at a high level (hereafter, referred to as the H level). The driving circuit 7 turns off the transistor 4 when the control signal Sa is at a low level (hereafter, referred to as the L level).

The driving circuit 7 includes a driving portion 13 and a current supply portion 14. The driving portion 13 includes a push pull circuit (not shown) at an output stage. The push pull circuit includes a high-side switching element and a low-side switching element. When the high-side switching element of the driving portion 13 is turned on, the current supply portion 14 supplies a driving current Id to the gate of the transistor 4. Accordingly, a gate capacitance of the transistor 4 is charged, the gate voltage Vg increases, and the transistor 4 is turned on. When the low-side switching element of the driving portion 13 is turned on, a discharge path from the gate of the transistor 4 to the ground line 11 is formed. Accordingly, the gate capacitance of the transistor 4 is discharged, the gate voltage Vd decreases, and the transistor 4 is turned on. In the present embodiment, the gate voltage Vg is also referred to as an input voltage of the transistor 4.

The current supply portion 14 supplies the driving current Id to the driving portion 13. The current supply portion 14 includes constant current sources 15, 16 and a switch 17. The constant current source 15 is supplied with electric power from a power supply terminal 18 and outputs a constant current having a first current value I1. The power supply terminal 18 is a supply terminal of a voltage Vdd higher than the battery voltage Vb. The constant current source 16 is supplied with electric power from the power supply terminal 18 and outputs a constant current having a second current value I2. An output terminal of the constant current source 15 is connected to the output terminal of the power supply portion 14, that is, the output terminal of the driving current Id. An output terminal of the constant current source 16 is connected to the output terminal of the current supply portion 14 via the switch 17. An on/off state of the switch 17 is controlled based on a restriction control signal Sb output from the restriction operation control circuit 8. Specifically, the switch 17 is turned off when the restriction control signal Sb is at the H level, and the switch 17 is turned on when the restriction control signal Sb is at the L level.

The magnitude of the driving current Id output from the current supply portion 14 is changed between two stages using the above-described configuration. When the restriction control signal Sb is at the H level, the switch 17 is turned off and the current value of the driving current becomes I1. When the restriction control signal Sb is at the L level, the switch 17 is turned on and the current value of the driving current Id becomes I1+I2. In this way, the driving current Id output from the current supply portion 14 becomes small when the restriction control signal Sb is at the H level, and the driving current Id becomes large when the restriction control signal Sb is at the L level. In other words, the driving current Id (=I1) when the restriction control signal is at the H level is a restricted current compared with the driving current Id (I1+I2) when the restriction control signal Sb is at the L level. The setting values of the current values I1, I2 are described later. The rise speed of the gate voltage Vg of the transistor 4 at turning-on and the rise time of the transistor 4 depend on the current value of the driving current Id output from the current supply portion 14.

The voltage control circuit 6 changes the duty ratio of the control signal Sa output to the driving circuit 7 based on the difference between the target value of the output voltage Vo and the feedback output voltage Vo so that the output voltage Vo corresponds to the target value. In other words, the power supply circuit 2 is a switching power supply of voltage mode control. The voltage control circuit 6 includes a reference voltage generation circuit 19, an operational amplifier 20, a triangle wave signal generation circuit 21, and a comparator 22. The reference voltage generation circuit 19 is, for example, a band gap reference circuit. The reference voltage generation circuit 19 generates a reference voltage Vr same as or corresponding to the target value (e.g., +5V) of the output voltage Vo. The output voltage Vo (the output voltage of the smoothing circuit 5) or a divided voltage of the output voltage Vo is input (fed back) to an inverting input terminal of the operational amplifier 20. The reference voltage Vr is input to a non-inverting input terminal of the operational amplifier 20. The operational amplifier 20 outputs an error signal that is obtained by amplifying the difference between a feedback voltage (i.e., the output voltage Vo or the divided voltage of the output voltage Vo) and the reference voltage Vr.

The triangle wave signal generation circuit 21 generates a triangle wave signal (a carrier wave of PWM) having a frequency corresponding to a PWM period. The error signal output from the operational amplifier 20 is input to a non-inverting input terminal of the comparator 22. The triangle wave signal output from the triangle wave signal generation circuit 21 is input to an inverting input terminal of the comparator 22. An output signal of the comparator 22 is synchronized with the triangle wave and changes depending on a comparison result of the feedback voltage and the reference voltage Vr. The output signal of the comparator 22 is output as the control signal Sa to the driving circuit 7 and the restriction operation control circuit 8. The control signal Sa becomes the L level when the feedback voltage is higher than the reference voltage Vr, and the control signal Sa becomes the H level when the feedback voltage is smaller than the H level.

The restriction operation control circuit 8 receives the source voltage Vs of the transistor 4 (the voltage of the node N1) and the control signal Sc output from the voltage control circuit 6. In the present embodiment, the source voltage Vs is also referred to as the output voltage of the transistor 4. The restriction operation control circuit 8 generates the restriction control signal Sb based on the source voltage Vs of the transistor 4 and the control signal Sa. The restriction operation control circuit 8 includes a threshold voltage generation circuit 23, a comparator 24, a NOT circuit 25, and an AND circuit 26. The threshold voltage generation circuit 23 generates a first threshold voltage V1. A setting value of the first threshold voltage V1 will be described later.

The source voltage Vs is input to a non-inverting input terminal of the comparator 24. The first threshold voltage V1 is input to an inverting input terminal of the comparator 24. An output signal of the comparator 24 is input to the NOT circuit 25. An output signal of the NOT circuit 25 is input to one input terminal of the AND circuit 26. The control signal Sa is input to the other input terminal of the AND circuit 26. An output signal of the AND circuit 26 is output as the restriction control signal Sb to the current supply portion 14 in the driving circuit 7.

Figures 2, 3:
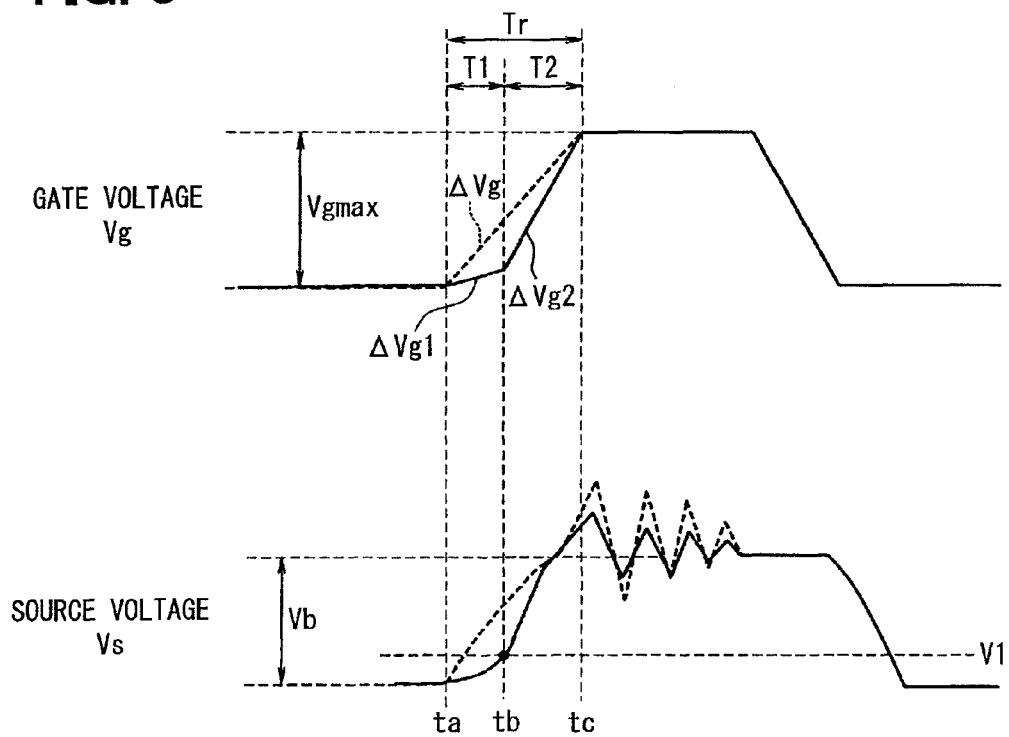
FIG. 2 is a diagram showing logic of input and output signals of a restriction operation control circuit according to the first embodiment.
FIG. 3 is a diagram showing a gate voltage and a source voltage of a transistor.

FIG. 2 is a diagram showing logic of the input and output signals of the restriction operation control circuit 8. A period when the control signal Sa is at the L level corresponds to the turn-off period in which the transistor 4 is turned off. During the turn-off period, the restriction control signal Sb becomes the L level regardless of the value of the source voltage Vs of the transistor 4. A period when the control signal Sa is at the H level corresponds to the turn-on period in which the transistor 4 is turned on. During the turn-on period, the logic of the restriction control signal Sb changes depending on the source voltage Vs of the transistor 4.

In the turn-on period, the restriction control signal Sb is at the H level before the source voltage Vs reaches the first threshold voltage V1 (the control signal Sa=the H level, the output signal of the comparator 24=the L level). Then, after the source voltage Vs reaches the first threshold voltage V1, the restriction control signal Sb becomes the L level (the control signal Sa=the H level, the output signal of the comparator 24=the H level).

In the present embodiment, the restriction operation control circuit 8 is an example of a turn-on restriction section that is capable of performing a restriction operation to restrict a turn-on speed of the transistor 4. The restriction operation control circuit 8 performs the restriction operation as described below. In the turn-on period of the transistor 4 (i.e., the period between time points ta and tc in FIG. 3 and corresponding to the rise time Tr), the restriction operation control circuit 8 outputs the restriction control signal Sb at the H level during a first period T1 from the start of turn-on (time point ta) to a time point at which the source voltage Vs reaches the first threshold voltage V1 (time point tb). Accordingly, the driving current Id output from the current supply portion 14 is restricted (Id=I1). Thus, during the first period T1, the restriction operation control circuit 8 performs the restriction operation and the rise speed (the voltage change amount) of the input voltage (the gate voltage Vg) of the transistor 4, that is, the turn-on speed is restricted. Accordingly, the output voltage (the source voltage Vs) of the transistor 4 gently increases in a state where the voltage change amount is restricted.

In the turn-on period, the restriction operation control circuit 8 outputs the restriction control signal Sb at the L level during a second period T2 from the end of the first period (time point tb) to the end of the turn-on period (time point tc). Accordingly, the driving current Id output from the current supply portion 14 is not restricted (Id=I1+I2). Thus, during the second period T2, the restriction operation control circuit 8 stops the restriction operation and the rise speed (the voltage change amount) of the input voltage of the transistor 4 is not restricted. Accordingly, the output voltage of the transistor 4 drastically increases in a state where the voltage change amount is large.

In a conventional configuration in which a transistor is turned on with a constant voltage change amount, a voltage change amount $\Delta Vg$ of an input voltage at turning-on is expressed as the following equation (1). In equation (1), a maximum value of a gate voltage is expressed as Vgmax and a rise time is expressed as Tr. The maximum value of the gate voltage depends on a power supply voltage of a driving circuit that drives a gate (charges a gate capacity).

$$\Delta Vg = Vg\text{max}/Tr \qquad (1)$$

On the other hand, the voltage change amount of the gate voltage Vg at turning-on in the present embodiment is defined as follows. The voltage change amount $\Delta Vg$ of the gate voltage Vg during the first period T1 is set to a value smaller than the conventional voltage change amount $\Delta Vg$ ($\Delta Vg1 < \Delta Vg$). The voltage change amount $\Delta Vg$ of the gate voltage Vg during the second period T2 is set to a value larger than the conventional voltage change amount $\Delta Vg$ ($\Delta Vg2 > \Delta Vg$). In addition, the voltage change amount $\Delta Vg1$ during the first period T1 and the voltage change amount $\Delta Vg2$ during the second period T2 are determined such that the length of the whole rise time Tr is equal to the length of the conventional rise time with satisfying the above-described condition.

The voltage change amount $\Delta Vg1$ of the gate voltage Vg during the first period T1 depends on the current value I1 of the constant current source 15. The voltage change amount $\Delta Vg2$ of the gate voltage Vg during the second period T2 depends on the current value I1 of the constant current source 15 and the current value I2 of the constant current source 16. Thus, the current values I1, I2 are determined so as to satisfy the above-described conditions relating to the voltage change amount Vg1, Vg2 of the gate voltage Vg.

Figure 4:
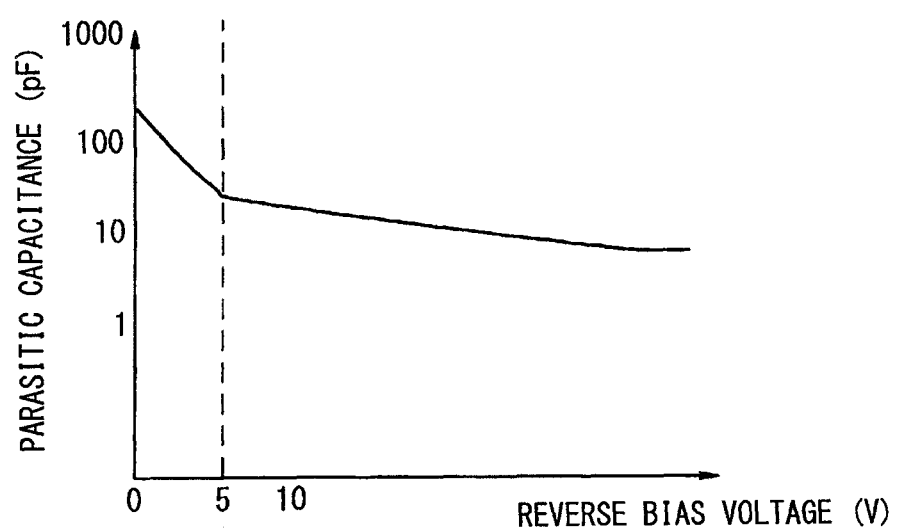
FIG. 4 is a diagram showing a relationship between a reverse bias voltage and a parasitic capacitance of a Schottky barrier diode.

The time point at which the voltage change amount of the gate voltage Vg is changed, that is, the time point at which execution and stop of the restriction operation is changed is determined by setting the first threshold voltage V1. In the present embodiment, the first threshold voltage V1 is set based on characteristics of the diode D1. FIG. 4 is a diagram showing a relationship between a reverse bias voltage of the diode D1, which is a Schottky barrier diode (SBD), and the capacitance value of the parasitic capacitance Cac. However, FIG. 4 is a single logarithmic chart.

As shown in FIG. 4, the parasitic capacitance Cac of the diode D1 becomes the maximum when the reverse bias voltage, which corresponds to the source voltage Vs of the transistor 4 in the present embodiment, is 0 V and drastically decreases with increase of the reverse bias voltage from 0 V. After the reverse bias voltage reaches the predetermined voltage (5 V in the present case), the parasitic capacitance Cac of the diode D1 gently decreases with increase of the reverse bias voltage. However, the parasitic capacitance Cac does not largely decreases from a time point at which the reverse voltage reaches the predetermined voltage. In consideration of the above-described characteristics of the diode D1, the first threshold voltage V1 is set to the above-described predetermined value, that is, 5 V so that the voltage change amount of the gate voltage Vg can be changed at a time point at which the parasitic capacitance Cac largely decreases.

During the period Pa, the output voltage Vo is higher than the reference voltage Vr. Thus, the control signal Sa is at the L level, and the gate voltage Vg of the transistor 4 is maintained at the OFF voltage (0 V). In addition, during the period Pa, the restriction control signal Sb is at the L level. When the output voltage Vo decreases below the reference voltage Vr (time point t1), the control signal Sa transitions to the H level. Accordingly, the gate voltage Vg of the transistor 4 starts increasing.

In addition, at the time point t1, the restriction control signal Sb transitions to the H level. Therefore, the driving current Id is restricted (Id=I1), and the gate voltage Vg of the transistor 4 increases at the voltage change amount $\Delta Vg1$ smaller than the conventional voltage change amount $\Delta Vg$. Accordingly, the source voltage Vs of the transistor 4 increases at the voltage change amount corresponding to the voltage change amount $\Delta Vg1$ of the gate voltage Vg. Thus, during the period Pb, the transistor 4 gently rises (turned on) in a state where the voltage change amount of the source voltage Vs is smaller than the conventional voltage change amount.

After that, when the source voltage Vs of the transistor 4 increases and exceeds the first threshold voltage V1, the restriction control signal Sb transitions to the L level (time point t2). Thus, the restriction of the driving current Id is released (Id=I1+I2), and the gate voltage Vg of the transistor 4 increases at the voltage change amount $\Delta Vg2$ larger than the conventional voltage change amount $\Delta Vg$. Accordingly, the source voltage Vs of the transistor 4 increases at the voltage change amount corresponding to the voltage change amount $\Delta Vg2$ of the gate voltage Vg. In other words, during the period Pc, the transistor 4 drastically rises (tuned on) in a state where the voltage change amount of the source voltage Vs is greater than the conventional voltage amount.

When the gate voltage Vg of the transistor 4 reaches the ON voltage (voltage Vdd) (time point t3), the gate voltage Vg stops increasing. Thus, during the period Pd, the gate voltage Vg is maintained at the ON voltage and the on-state of the transistor 4 is maintained. After that, when the output voltage Vo increases and exceeds the reference voltage Vr (time point t4), the control signal Sa transitions to the L level. Accordingly, the gate voltage Vg of the transistor 4 starts decreasing. In this case, the gate voltage Vg of the transistor 4 decreases at the voltage change amount depending on the electrostatic capacitance value of the gate capacitance and the impedance of the discharge path of the gate capacitance.

Accordingly, the source voltage Vs of the transistor 4 decreases at the voltage change amount corresponding to the voltage change amount of the gate voltage Vg. In other words, during the period Pe, the transistor 4 falls (turned off). When the gate voltage Vg of the transistor 4 reaches the OFF voltage (0 V) (the time point t5), the gate voltage Vg stops decreasing. Thus, during the period Pf, the gate voltage Vg is maintained at the OFF voltage and the off-state of the transistor 4 is maintained. When the transistor 4 is turned off, the source voltage Vs decreases to the voltage −Vf that is lower than 0 V by the forward voltage Vf of the diode D1.

According to the above-described configuration, the following functions and effects can be obtained. The source of the transistor 4 is connected to the cathode of the diode D1 forming the smoothing circuit 5. Between the terminals of the diode D1, the parasitic capacitance Cac exists. In general, in the diode, a depletion layer expands and the electrostatic capacitance value of the parasitic capacitance decreases with increase of the reverse bias voltage. Thus, the parasitic capacitance Cac of the diode D1 becomes the maximum when the reverse bias voltage (the source voltage Vs) applied between the terminals is zero and decreases with increase of the reverse bias voltage. As shown by the following equation (2), the reverse current I generated when the transistor 4 is turned on is proportional to the electrostatic capacitance value C of the parasitic capacitance Cac and the voltage change amount (dv/dt) of the source voltage Vs of the transistor 4.

$$I = C \times (dv/dt) \qquad (2)$$

In view of the above-described points, the restriction operation control circuit 8 performs the restriction operation as described below so as to reduce the switching noise due to the reverse current. During the period Pb from the start of the turn-on period of the transistor 4 until the predetermined time elapses, the restriction operation control circuit 8 performs the restriction operation. In other words, during the period Pb, the turn-on speed of the transistor 4 is restricted, and the transistor 4 gently rises in a state where the voltage change amount of the source voltage Vs, which is the reverse voltage of the diode D1, is small. During the period Pc after the period Pb, the restriction operation is stopped. In other words, during the period Pc, the turn-on speed of the transistor 4 is not restricted, and the transistor 4 drastically rises in a state where the voltage change amount of the source voltage Vs, which is the reverse bias voltage of the diode D1, is large.

As described above, the transistor 4 gently rises during the period Pb in which the reverse bias voltage applied to the diode D1 is relatively small and the electrostatic capacitance value of the parasitic capacitance Cac is relatively large. Accordingly, the voltage change amount in the first half of turning-on is restricted to be small, the reverse current that flows at a moment of rising becomes smaller than the conventional configuration (see the reverse current of the diode D1 in FIG. 5), and generation of the switching noise can be reduced (see the source voltage Vs in FIG. 5). Then, the transistor 4 drastically rises during the period Pc in which the reverse bias voltage applied to the diode D1 is relatively large and electrostatic capacitance value of the parasitic diode Cac is relatively small. Accordingly, the voltage change amount in the second half of turning-on increases, and increase of length of the turn-on period (rise time) can be restricted.

During the period Pc, the reverse bias voltage of the diode D1 (the source voltage Vs of the transistor 4) increases and the electrostatic capacitance value of the parasitic capacitance Cac decreases compared with the period Pb. Thus, as is clear from the equation (2), even when the voltage change amount (dv/dt) of the source voltage Vs increases, generation of the reverse current can be restricted. In other words, generation of the reverse current can be restricted over the whole turning-period (i.e. the period Pb and the period Pc). When the generation of the reverse current is restricted, storage of the resonance energy which causes the switching noise in the power supply circuit 2 is restricted.

Figure 5:
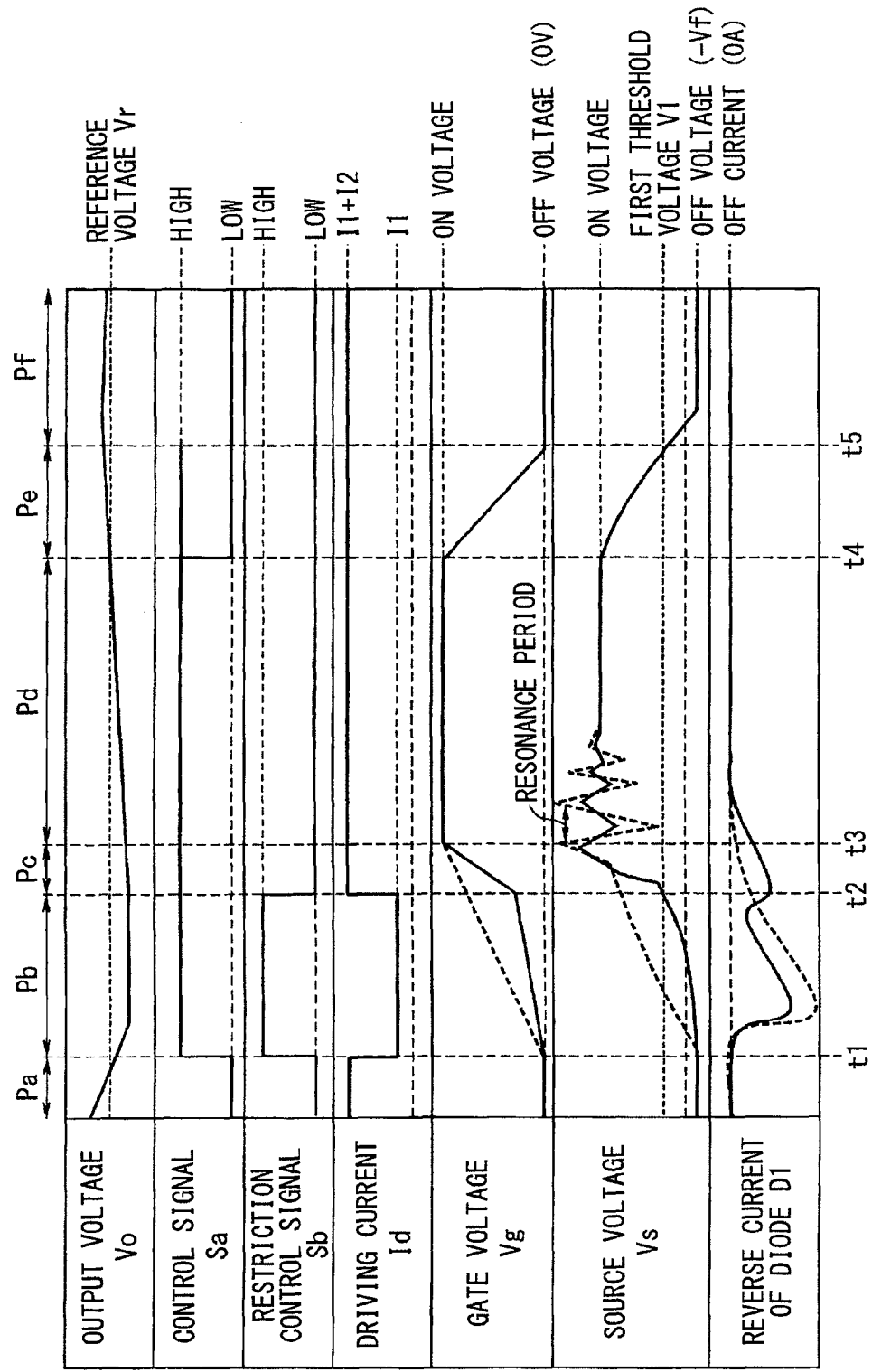
FIG. 5 is a timing diagram showing an operation of a power supply circuit according to the first embodiment.
Figures 6, 8:
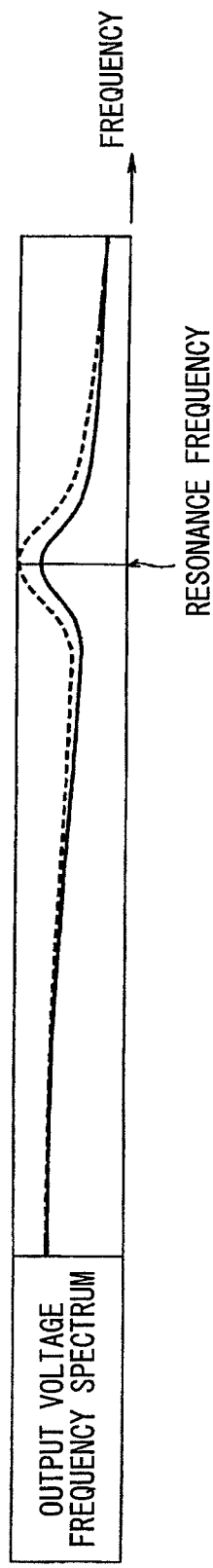
FIG. 6 is a diagram showing a frequency spectrum of a source voltage of a transistor.
FIG. 8 is a diagram showing logic of input and output signals of a restriction operation control circuit according to the second embodiment.

Thus, as shown by the source voltage Vs in FIG. 5 and the frequency spectrum of the source voltage Vs in FIG. 6, the switching noise generated in the LC resonant frequency can be restricted compared with the conventional configuration shown by dashed lines in FIG. 5 and FIG. 6. As described above, the electronic control device 1 according to the present embodiment can reduce the switching noise due to the reverse current at turning on while restricting increase of the power consumption and the heat generation amount.

A power supply circuit mounted in a vehicle needs to supply stable voltage and current to a power supplied object (circuit or device) even when input power largely changes. This is because an output voltage of a battery in a vehicle largely changes. Thus, a configuration of the power supply circuit mounted in the vehicle mainly employs a diode rectification method that uses a diode as a rectifier not a synchronization rectification method that uses a MOS transistor as a rectifier. Conventionally, as a rectification diode used in the diode rectification method, a switching diode capable of responding to high-speed driving is employed. However, recently, a Schottky barrier diode that is capable of being driven by high current is commonly used as a rectification diode so as to correspond to increase of electric current of an electronic component of the power supply object such as microcomputer. Therefore, the power supply circuit 2 employs the diode rectification method and uses the Schottky barrier diode as the rectification diode D1.

When the Schottky barrier diode is used, the electrostatic capacitance value of the parasitic capacitance is high when the reverse bias voltage is not applied. Thus, the reverse current, which causes the switching noise, increases. However, the electrostatic capacitance value of the parasitic capacitance drastically decreases with increase of the reverse bias voltage (see FIG. 4). Thus, the power supply circuit 2 using the Schottky barrier diode as the diode D1 is preferably suitable as the power supply circuit mounted in the vehicle and can restrict generation of the reverse current, which is a demerit of the Schottky barrier diode, and generation of the switching noise by the above-described method.

The relationship between the electrostatic capacitance value of the parasitic capacitance of the diode and the reverse bias voltage depends on each element. Thus, when the switching time of the restriction operation (the time point at transition from the period Pb to the period Pc), that is, the length of the predetermined time is determined based on the characteristics of the diode used as the diode D1, the above-described effect can be obtained at the maximum. In the present embodiment, in view of the characteristics of the diode D1, the first threshold voltage V1 is determined such that the restriction operation is performed during the period in which the parasitic capacitance drastically decreases, and the restriction operation is stopped during the period in which the parasitic capacitance almost fully decreases. Accordingly, the restriction operation is performed during the period in which the parasitic capacitance of the diode D1 is relatively large and the restriction operation is stopped during the period in which the parasitic capacitance of the diode D1 is almost smallest. Therefore, the electronic control device 1 according to the present embodiment can achieve the effect of restricting increase of the turn-on period and the effect of reducing the switching noise at a maximum.

Because the battery voltage supplied from the in-vehicle battery is input to the power supply circuit mounted in the vehicle, the input voltage of the power supply circuit mounted in the vehicle is higher than an input voltage of a power supply circuit mounted in a consumer product such as a mobile phone. When an input voltage of a buck switching power supply (the drain voltage of the transistor 4) is high, a peak value of an output voltage of a switching transistor (the source voltage Vs of the transistor 4) is high. If the switching period is the same, the voltage change amount and the reverse current increase with increase of the peak value of the output voltage. Thus, in the power supply circuit 2 mounted in the vehicle, the problem of the switching noise due to the reverse current is exposed compared with the power supply circuit mounted in the consumer product. However, because the electronic control device 1 according to the present embodiment can restrict generation of the reverse current over the whole turn-on period, the electronic control device 1 can effectively restrict generation of the switching noise due to the reverse current in the power supply circuit 2 mounted in the vehicle.

Second Embodiment

Figure 7:
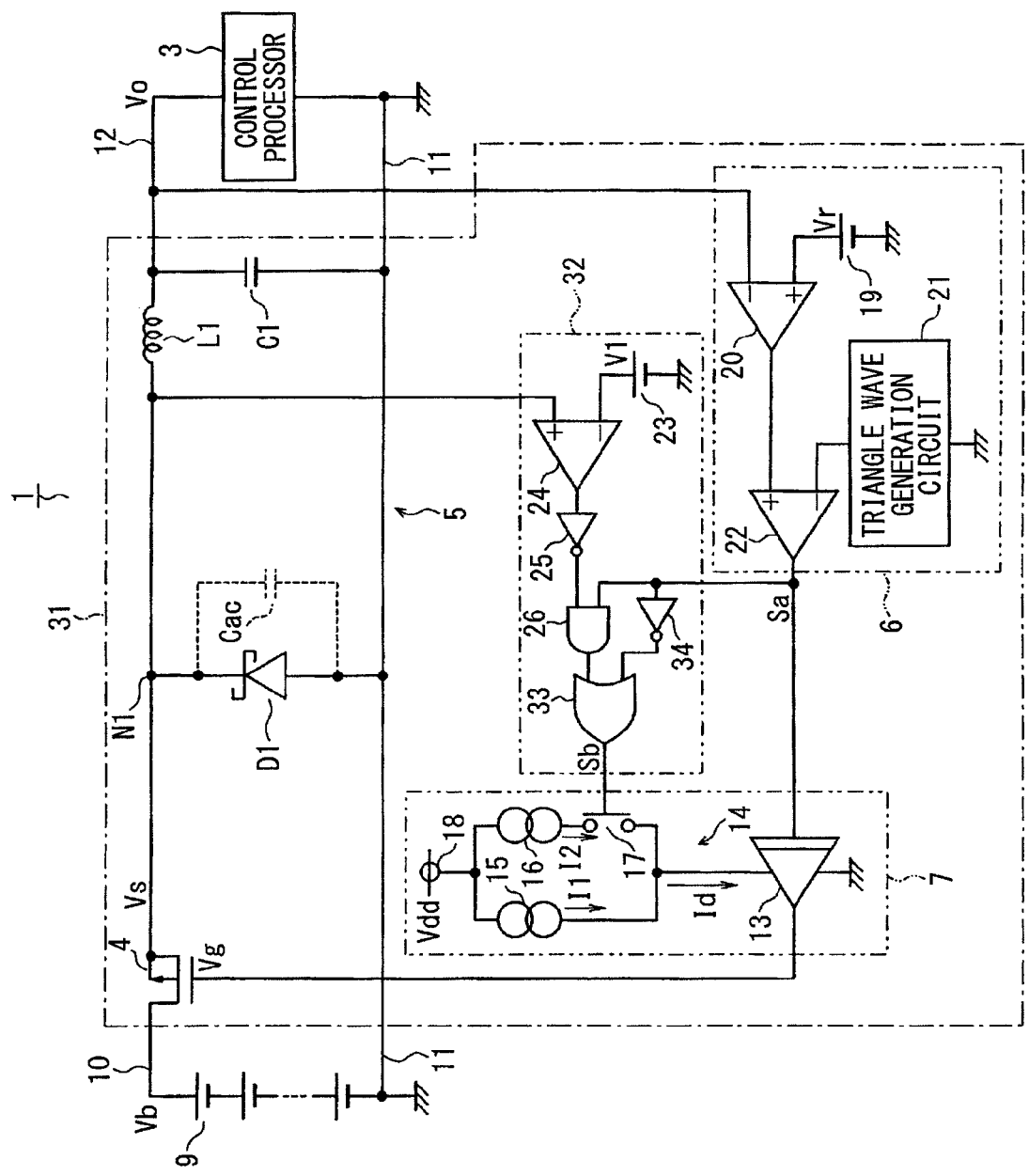
FIG. 7 is a diagram showing an electronic control device according to a second embodiment of the present disclosure.

An electronic control device 1 according to a second embodiment of the present disclosure will be described with reference to FIG. 7 to FIG. 9. The electronic control device 1 according to the present embodiment includes a power supply circuit 31. The power supply circuit 31 is an example of a voltage converter. The power supply circuit 31 includes a restriction operation control circuit 32. Compared with the restriction operation control circuit 8 in the first embodiment, the restriction operation control circuit 32 further includes an OR circuit 33 and a NOT circuit 34.

The output signal of the AND circuit 26 is input to one input terminal of the OR circuit 33. The control signal Sa is also input to the NOT circuit 34. The output signal of the NOT circuit 34 is input to the other input terminal of the OR circuit 33. The output signal of the OR circuit 33 is transmitted as the restriction control signal Sb to the current supply portion 14 of the driving circuit 7.

FIG. 8 is a diagram showing logic of the input and output signals of the restriction operation control circuit 32. When the control signal Sa is at the L level, that is, during the turn-off period of the transistor 4, the restriction control signal Sb is at the H level regardless of the source voltage Vs of the transistor 4. On the other hand, when the control signal Sa is at the H level, that is, during the turn-on period of the transistor 4, the logic of the control signal Sb changes depending on the source voltage Vs of the transistor 4 in a manner similar to the restriction operation control circuit 8 in the first embodiment.

During the turn-off period in which the transistor 4 is turned off, the power supply circuit 31 operates as described below. As shown in FIG. 9, at transition from the period Pd to period Pe (time point t4), the restriction control signal Sb transitions to the H level. Accordingly, the driving current Id is restricted (Id=I1). In other words, the driving current Id is restricted just before the start of the turn-off period. Therefore, at the start of the turn-off period, the amount of charge stored in the gate capacitance of the transistor 4 is slightly less than the first embodiment. Thus, the gate voltage Vg of the transistor 4 decreases at a voltage change amount larger than the voltage change amount of the first embodiment, which is shown by a dashed dotted line in FIG. 9. Accordingly, the source voltage Vs of the transistor 4 decreases at a voltage change amount larger than the voltage change amount of the first embodiment, which is shown by a dashed dotted line in FIG. 9.

In the electronic control device 1 according to the present embodiment, during the period Pe, the transistor 4 is drastically falls compared with the configuration of the first embodiment. Thus, compared with the first embodiment, the turn-off period of the transistor 4 is shortened, and a loss in the turn-off period can be reduced. Thus, the electronic control device 1 according to the present embodiment can achieve effects similar to the effects of the first embodiment and can further restrict the power consumption and the heat generation amount.

Third Embodiment

Figure 10:
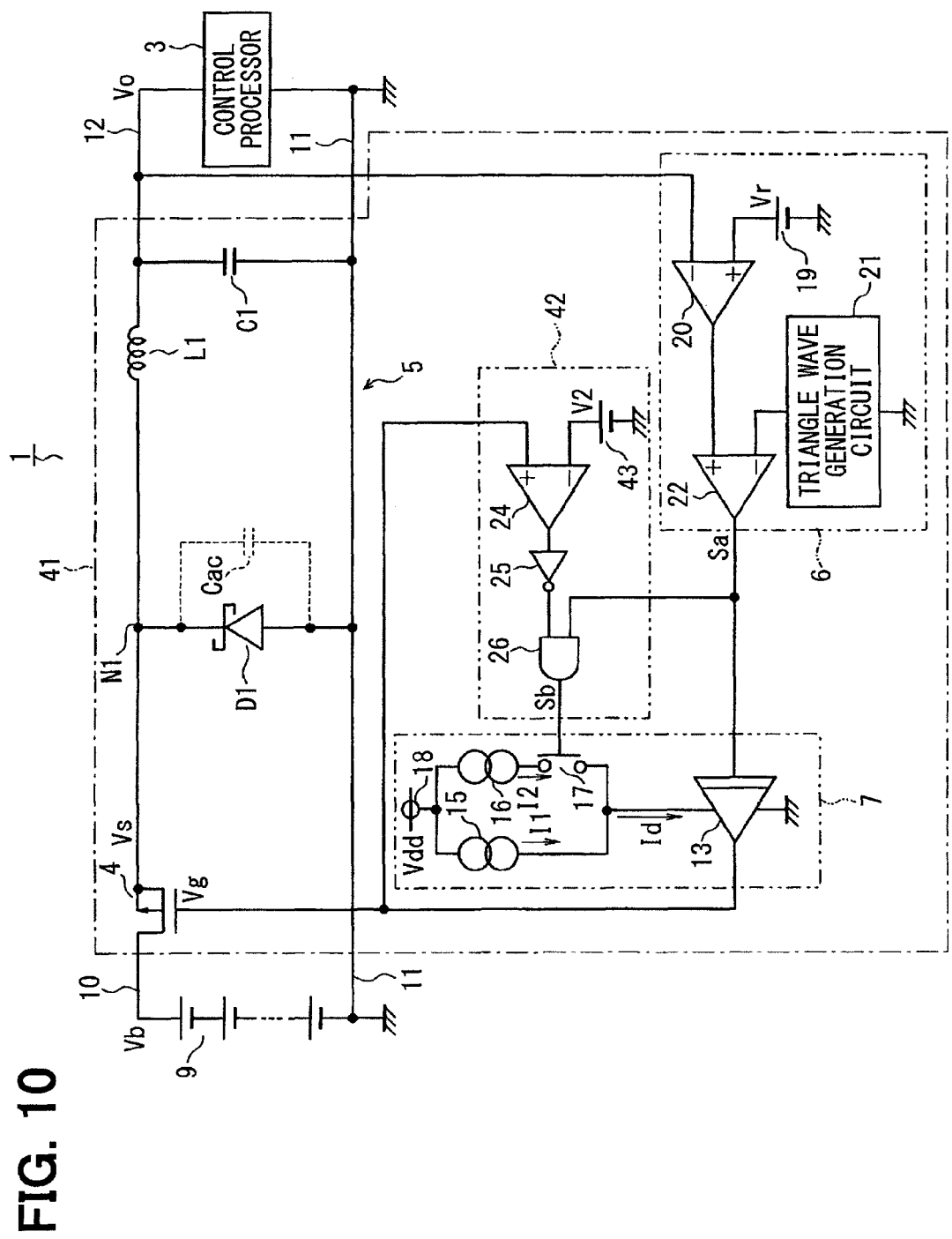
FIG. 10 is a diagram showing an electronic control device according to a third embodiment of the present disclosure.

An electronic control device 1 according to a third embodiment of the present disclosure will be described with reference to FIG. 10 and FIG. 11. The electronic control device 1 according to the present embodiment includes a power supply circuit 41. The power supply circuit 41 is an example of a voltage converter. The power supply circuit 41 includes a restriction operation control circuit 42. The restriction operation control circuit 42 is different from the restriction operation control circuit 8 in that a threshold voltage generation circuit 43 is provided instead of the threshold voltage generation circuit 23 and a gate voltage Vg is input instead of the source voltage Vs of the transistor 4. The threshold voltage generation circuit 43 generates a second threshold voltage V2. In the present case, the gate voltage Vg is input to the non-inverting input terminal of the comparator 24 and the second threshold value V2 is input to the inverting input terminal of the comparator 24.

In the present embodiment, a time point at which the voltage change amount of the gate voltage Vg is changed, that is, the time point at which execution and stop of the restriction operation is switched is determined by setting of the second threshold voltage V2. The second threshold voltage V2 is set as follows based on the characteristics of the diode D1. The gate voltage Vg and the electrostatic capacitance value of the parasitic capacitance Cac of the diode D1 have a relationship shown in FIG. 11. In FIG. 11, a relationship between the reverse bias voltage of the diode D1 (the source voltage Vs) and the electrostatic capacitance value of the parasitic capacitance Cac is shown by a dashed line.

Figure 11:
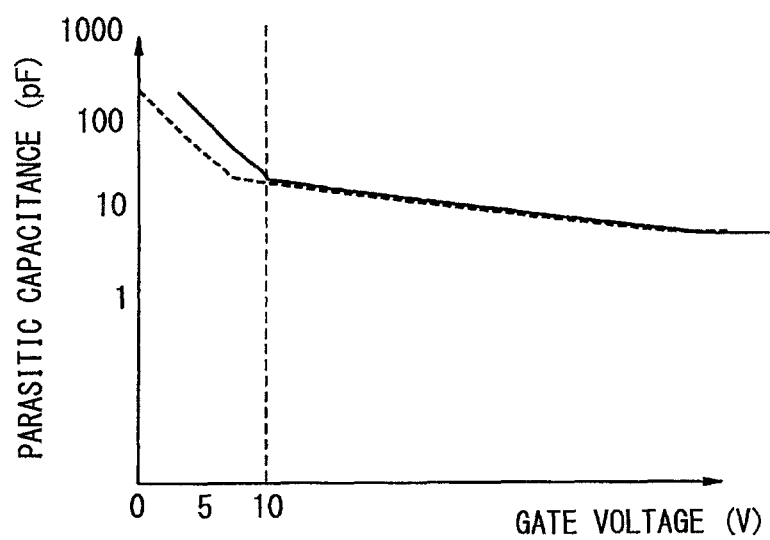
FIG. 11 is a diagram showing a relationship between a gate voltage of a transistor and a parasitic capacitance of a Schottky barrier diode.

As shown in FIG. 11, a characteristic curve (solid line) showing the relationship between the gate voltage Vg and the parasitic capacitance is shifted to a plus direction in a horizontal axis (voltage) compared with a characteristic curve (dashed line) showing the relationship between the source voltage Vs, which is the reverse bias voltage, and the parasitic capacitance. This is because, from influence of a gate threshold voltage of the transistor 4 and the like, the source voltage Vs starts rising after a predetermined relay time with respect to rise of the gate voltage Vg and follows the change of the gate voltage Vg. In view of the above-described point, in the present embodiment, the second threshold voltage V2 is set to a value higher than the first threshold voltage V1 (5V) by a shifted voltage of the characteristic curves. Accordingly, the electronic control device 1 according to the present embodiment can change the voltage change amount of the gate voltage Vg at a time point at which the parasitic capacitance Cac largely decreases in a manner similar to the first embodiment.

The electronic control device 1 according to the present embodiment can achieve effects similar to the effects of the first embodiment. A method in which the switching time (the predetermined time) of the restriction operation is set based on the gate voltage Vg as described in the present embodiment is more complicated than a method in which the switching time of the restriction operation is set based on the source voltage Vs, which is the reverse bias voltage of the diode D1, as described in the first embodiment. However, the voltage change of the gate voltage Vg is smaller than the voltage change of the source voltage Vs and noise is reduced. Thus, the configuration of the present embodiment has a merit that the switching time of the restriction operation is less likely to change due to influence of noise or the like.

Fourth Embodiment

Figure 12:
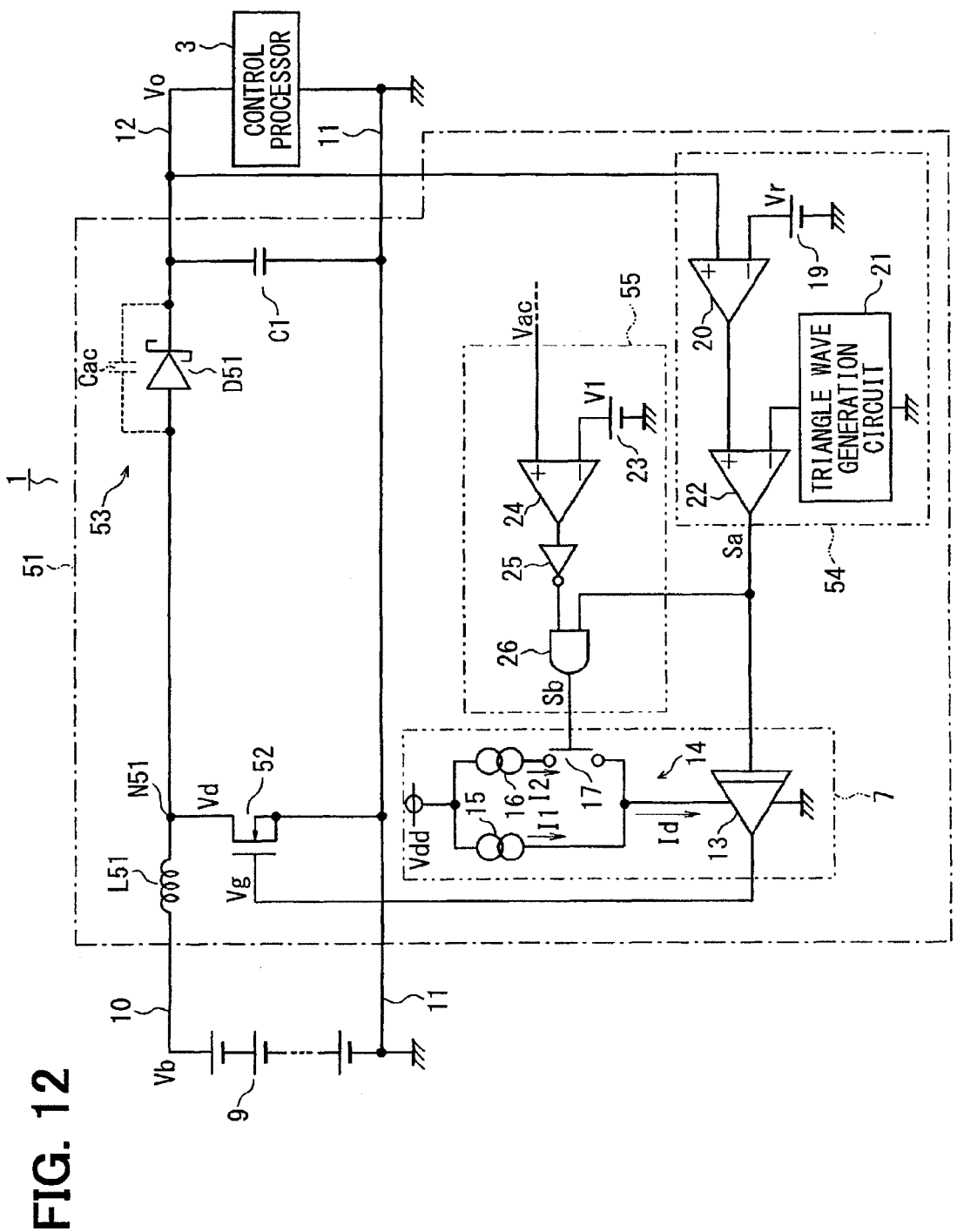
FIG. 12 is a diagram showing an electronic control device according to a fourth embodiment of the present disclosure.

An electronic control device 1 according to a fourth embodiment of the present disclosure will be described with reference to FIG. 12 to FIG. 14. As shown in FIG. 12, the electronic control device 1 includes a power supply circuit 51. The power supply circuit 51 is an example of the voltage converter. The power supply circuit 51 is a boost switching power supply differently from the power supply circuit 2 according to the present embodiment. The power supply circuit 51 includes a transistor 52, an inductor L51, a smoothing circuit 53, a voltage control circuit 54, a driving circuit 7, and a restriction operation control circuit 55. The power supply circuit 51 controls driving of the transistor 52 with pulse width modulation control so as to boost a direct-current power supplied from a battery 9 mounted in the vehicle. The battery 9 is an example of a direct-current power source. In elements forming the power supply circuit 51, elements except for the inductor L51 and a part (capacitor C1) of elements forming the smoothing circuit 53 are formed as a semiconductor integrated circuit (IC).

The inductor L51 is connected between the input power supply line 10 and the node N51. In other words, the inductor L51 is disposed on the power supply path from the battery 9 to the control processor 3. The transistor 52 is an example of a switching element. The transistor 52 is an N-channel type MOS transistor. A drain of the transistor 52 is connected to the node N51. A source of the transistor 52 is connected to the ground line 11. In other words, the transistor 4 is disposed between the inductor L51 and the ground line 11. The driving signal from the driving circuit 7 is input to a gate of the transistor 52. Energy stored at the inductor L51 during a period in which the transistor 52 is driven is added to the battery Vb, and a pulsed voltage (boost voltage) having a peak value higher than the battery voltage Vb is generated at the node N51.

The smoothing circuit 53 rectifies and smoothes the pulsed boost voltage generated at the node N51 and outputs a rectified and smoothed voltage. The smoothing circuit 53 includes a diode D1 for rectifying and a capacitor C1 for smoothing. The diode D1 is a Schottky barrier diode similarly to the diode D1. The diode D51 is connected between the node N51 and the output power supply line 12 such that an anode of the diode D51 is connected to the node N51. The diode D51 includes a parasitic capacitance Cac similarly to the diode D1. The parasitic capacitance Cac is shown by a dashed line in FIG. 12.

In a manner similar to the voltage control circuit 6, the voltage control circuit 54 changes the duty ratio of the control signal Sa output to the driving circuit 7 based on the difference between the target value of the output voltage Vo and the feed back output voltage Vo so that the output voltage Vo corresponds to the target value. Thus, the voltage control circuit 54 has a configuration similar to the voltage control circuit 6. However, because the power supply circuit 51 is the boost switching power supply, the voltage control circuit 51 is different from the voltage control circuit 6 in that the voltages input to input terminals of the operational amplifier 20 are changed.

The output voltage Vo (the output voltage of the smoothing circuit 53) or a divided voltage of the output voltage Vo is input to a non-inverting input terminal of the operational amplifier 20. The reference voltage Vr is input to an inverting input terminal of the operational amplifier 20. In the voltage control circuit 54, the control signal Sa, which is the output signal of the comparator 22, is at the L level during a period in which the feedback voltage is smaller than the reference voltage Vr and is at the H level during a period in which the feedback voltage is larger than the reference voltage Vr.

The restriction operation control circuit 55 is an example of a turn-on restriction section. The restriction operation control circuit 55 has a configuration similar to the restriction operation control circuit 8. However, because the power supply circuit 51 is the boost switching power supply, the restriction operation control circuit 55 receives an input-output voltage Vac of the smoothing circuit 53 not the source voltage of the transistor 52. The input-output voltage Vac of the smoothing circuit 53 is a voltage of the cathode of the diode D51 with respect to a voltage of the anode of the diode D51 and corresponds to a reverse bias voltage of the diode D51. Similarly to the restriction operation control circuit 8, the input and output signals of the restriction operation control circuit 55 have logic shown in FIG. 2.

Figure 13:
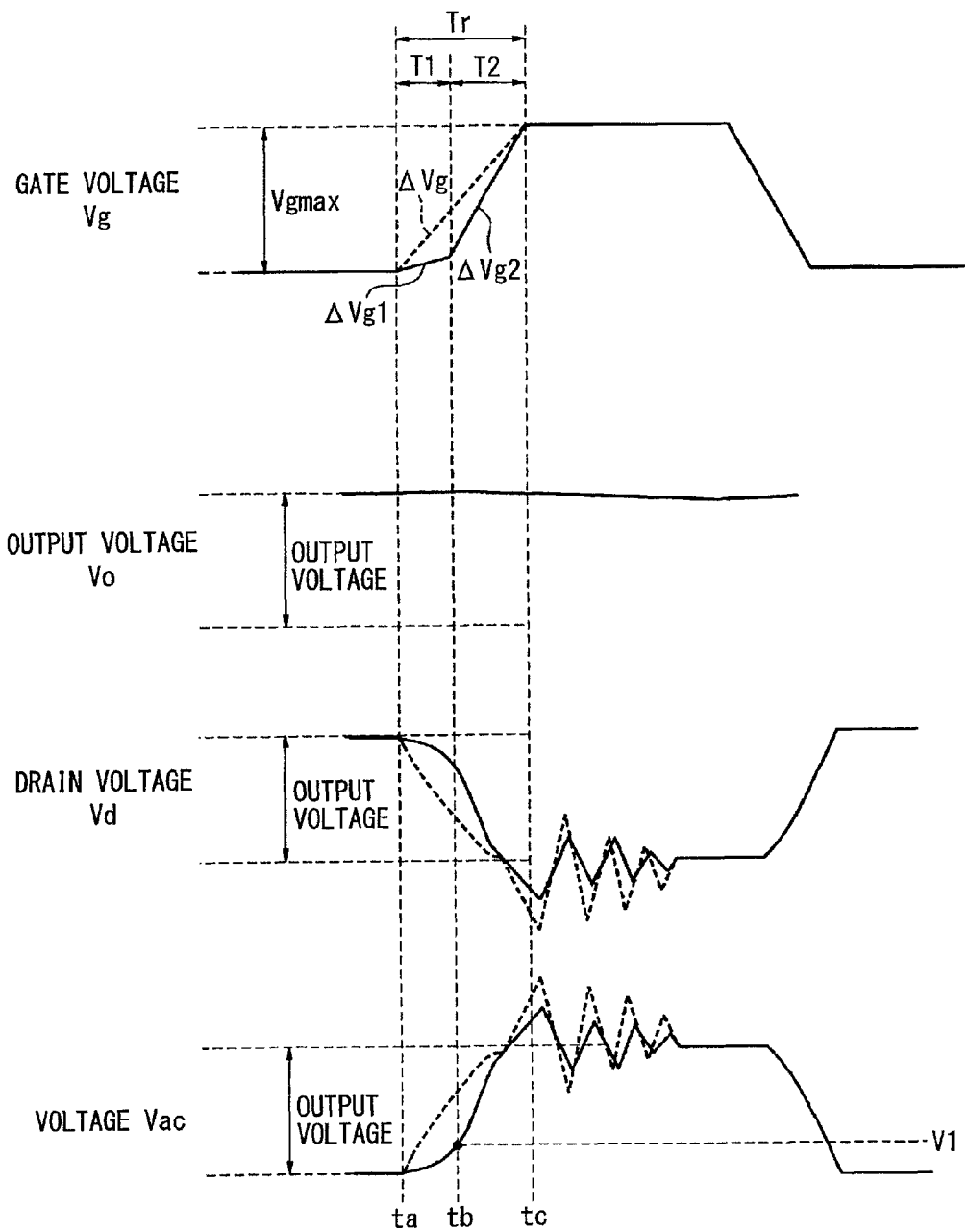
FIG. 13 is a diagram showing a gate voltage of a transistor, an output voltage of a power supply circuit, a drain voltage of the transistor, and an input-output voltage of a smoothing circuit according to the fourth embodiment.
Figure 14:
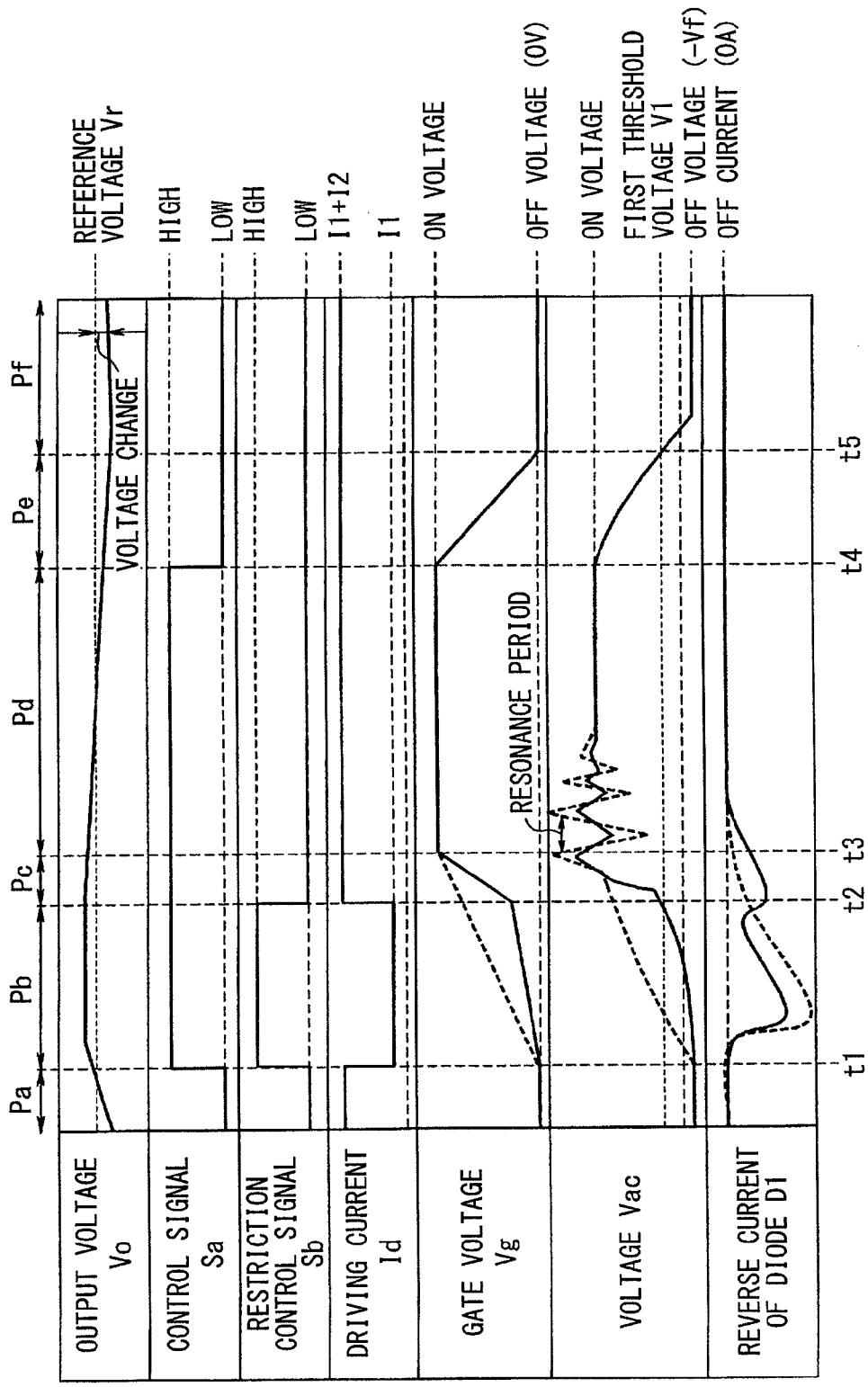
FIG. 14 is a timing diagram showing an operation of the power supply circuit according to the fourth embodiment.

As shown in FIG. 13, the gate voltage Vg and the drain voltage Vd of the transistor 52 change in opposite phases. Thus, the input-output voltage Vac of the smoothing circuit 53 corresponding to the difference between the output voltage Vo and the drain voltage Vd changes following the gate voltage Vg. As described above, the input-output voltage Vac of the smoothing circuit 53 corresponds to the reverse bias voltage of the diode D51. In the present embodiment, the voltage change amount of the gate voltage Vg is changed based on a comparison result of the input-output voltage Vac of the smoothing circuit 53 and the first threshold voltage V1.

An operation of the power supply circuit 51 for one period will be described with reference to FIG. 14.

During the period Pa, the output voltage Vo is lower than the reference voltage Vr. Thus, the control signal Sa is at the L level, and the gate voltage Vg of the transistor 52 is maintained at the OFF voltage (0 V). In addition, during the period Pa, the restriction control signal Sb is at the L level. When the output voltage Vo decreases below the reference voltage Vr (time point t1), the control signal Sa transitions to the H level. Accordingly, the gate voltage Vg of the transistor 52 starts increasing.

In addition, at the time point t1, the restriction control signal Sb transitions to the H level. Therefore, the driving current Id is restricted (Id=I1), and the gate voltage Vg of the transistor 52 increases at the voltage change amount ΔVg1 smaller than the conventional voltage change amount ΔVg. Accordingly, the input-output voltage Vac of the smoothing circuit 53 increases at the voltage change amount corresponding to the voltage change amount ΔVg1 of the gate voltage Vg. Thus, during the period Pb, the transistor 52 gently rises (turned on) in a state where the voltage change amount of the input-output voltage Vac of the smoothing circuit 53 is smaller than the conventional voltage change amount.

After that, when the input-output voltage Vac of the smoothing circuit 53 increases and exceeds the first threshold voltage V1, the restriction control signal Sb transitions to the L level (time point t2). Thus, the restriction of the driving current Id is released (Id=I1+I2), and the gate voltage Vg of the transistor 52 increases at the voltage change amount ΔVg2 larger than the conventional voltage change amount ΔVg. Accordingly, the input-output voltage Vac of the smoothing circuit 53 increases at the voltage change amount corresponding to the voltage change amount ΔVg2 of the gate voltage Vg. Thus, during the period Pc, the transistor 52 drastically rises (turned on) in a state where the voltage change amount of the input-output voltage Vac of the smoothing circuit 53 is larger than the conventional voltage change amount.

When the gate voltage Vg of the transistor 52 reaches the ON voltage (time point t3), the gate voltage Vg stops increasing. Thus, during the period Pd, the gate voltage Vg is maintained at the ON voltage and the on-state of the transistor 52 is maintained. After that, when the output voltage Vo decreases below the reference voltage Vr (time point t4), the control signal Sa transitions to the L level. Accordingly, the gate voltage Vg of the transistor 52 starts decreasing. In this case, the gate voltage Vg of the transistor 52 decreases at the voltage change amount depending on the electrostatic capacitance value of the gate capacitance and the impedance of the discharge path of the gate capacitance.

Accordingly, the input-output voltage Vac of the smoothing circuit 53 decreases at the voltage change amount corresponding to the voltage change amount of the gate voltage Vg. In other words, during the period Pe, the transistor 52 falls (turned off). When the gate voltage Vg of the transistor 52 reaches the OFF voltage (0V) (time point t5), the gate voltage Vg stops decreasing. Thus, during the period Pf, the gate voltage Vg is maintained at the OFF voltage and the off-state of the transistor 52 is maintained. When the transistor 52 is turned off, the input-output voltage Vac of the smoothing circuit 53 becomes −Vf, where Vf is the forward voltage of the diode D51. However, when the output voltage Vo changes depending on the operation state of the control processor 3 which is the load of the power supply circuit 51, the input-output voltage Vac in state where the transistor 52 is in the off-state changes from the above-described value depending on the change of the output voltage Vo.

As described above, also the power supply circuit 51, which is the boost switching power supply, can achieve functions and effects similar to the functions and the effects of the power supply circuit 2 in the first embodiment. The power supply circuit 51 may be controlled at turning off in a manner similar to the power supply circuit 31 in the second embodiment. Accordingly, the present embodiment can achieve effects similar to the effects of the second embodiment.

Other Embodiments

The present disclosure is not limited to each of the above-described embodiments described with reference to the drawings, and it is to be noted that various changes and modifications will become apparent to those skilled in the art. The length of the period Pb in the turn-on period in which the transistor 4, 52 is turned on, that is, the length of the predetermined time in which the restriction control signal Sb is set at the H level and the restriction operation is performed in the turn-on period can be changed as needed. As described above, the parasitic capacitance of the diode becomes the largest when the reverse bias voltage is not applied. Thus, when the period Pb is provided from the start of the turn-on period, regardless of the length of the period Pb (length of the predetermined period), the reverse current in the turn-on period can be restricted and the switching noise can be reduced compared with the conventional technique.

The diodes D1, D51 for rectification may be other diodes such as PN-junction diodes. Because any diode has a parasitic capacitance similarly to a Schottky barrier diode, the functions and effects of each of the above-described embodiments can be achieved.

A switching element that switches the direct-current power supplied from the direct-current power supply is not limited to an N-channel MOS transistor and various kinds of semiconductor switching element can be employed. For example, as the transistor 4, a P-channel MOS transistor, an IGBT, or a bipolar transistor can be employed. As the transistor 52, an IGBT or an NPN bipolar transistor can be employed.

Specific configurations of the driving circuits are not limited to the configurations shown in FIG. 1, FIG. 7, FIG. 10, and FIG. 12, and the configurations may be changed as needed. When specific configurations of the driving circuits are changed, specific configurations of the turn-on restriction sections need to be changed. Specific configurations of the turn-on restriction sections are not limited to the configurations shown in FIG. 1, FIG. 7, FIG. 10, or FIG. 12, and the turn-on restriction sections may include circuits having similar functions.

The diodes D1, D51 may be built in the semiconductor integrated circuits and may be disposed outside semiconductor integrated circuits. In cases where the diodes D1, D51 are built in the semiconductor integrated circuits, sizes of the electronic control devices can be reduced. In cases where the diodes D1, D51 are disposed outside the semiconductor integrated circuits, the diodes D1, D5 can be easily exchanged depending on the intended use. Thus, degree of freedom of design of power supply circuits can be increased.

The restriction operation control circuit 32 according to the second embodiment changes the restriction control signal Sb to the H level at transition from the period Pd to the period Pe. However, the operation of the restriction operation control circuit 32 may be changed as follows. In the period Pd, the restriction operation control circuit 32 may control the restriction control signal Sb to be the H level at least during a period adjacent to the period Pe (turn-off period). Accordingly, the driving current Id is restricted at least in a last phase of the period Pd. Thus, the charge amount stored in the gate capacity at the start of the turn-off period is further reduced and the turn-on speed can be improved. Therefore, the turn-off period can be further shortened, and the power consumption and the heat generation amount can be further reduced.

In a power supply circuit using a synchronization rectification method in which a MOS transistor is used as a rectifier, a parasitic capacitance exists between a drain and a source of the MOS transistor. In addition, a parasitic capacitance also exists in other circuit elements such as an inductor. Thus, also in the power supply circuit using the synchronization rectification method, a similar issue as the power supply circuit using the diode rectification method (i.e., generation of a switching noise due to a reverse current at turning-on) exists due to the parasitic capacitance. Thus, the present disclosure, which can restrict the reverse current generated due to the parasitic capacitance, can achieve useful effects also in the power supply circuit using the synchronization rectification method.

In each of the above-described embodiments, the power supply circuit (voltage converters) in which a voltage mode is controlled is described as an example. The present disclosure may also be applied to a power supply circuit in which a current mode is controlled. In each of the above-described embodiments, the power supply circuit included in the electronic control device 1 for the vehicle is described as an example. However, the present disclosure may also be applied to a power supply circuit included in an electronic control device for various products such as a consumer product.

What is claimed is:

1. An electronic control device comprising a voltage converter and a control processor operating by receiving an electric power supplied from the voltage converter, the voltage converter including:
   a switching element switching a direct-current power supplied from a direct-current power source;
   a smoothing circuit smoothing the direct-current power switched by the switching element and outputting a smoothed direct-current power;
   a voltage control circuit generating a control signal based on the smoothed direct-current power output from the smoothing circuit;
   a driving circuit driving the switching element based on the control signal; and
   a turn-on restriction section capable of performing a restriction operation to restrict a turn-on speed of the switching element,
   wherein the turn-on restriction section includes a comparator, the comparator receives a voltage of a main terminal of the switching element connected to the smoothing circuit and determines whether the voltage of the main terminal of the switching element reaches a threshold voltage,
   wherein the turn-on restriction section performs the restriction operation for a predetermined time after a start of a turn-on period in which the switching element is turned on, and the turn-on restriction section stops the restriction operation after the predetermined time has elapsed, wherein the smoothing circuit includes an element connected to the main terminal of the switching element and having a parasitic capacitance,
wherein the parasitic capacitance decreases with increase of the voltage of the main terminal of the switching element, and
wherein the predetermined time is set to a time from the start of the turn-on period until the voltage of the main terminal of the switching element reaches the threshold voltage.

2. The electronic control device according to claim 1,
wherein the driving circuit includes a driving portion and a current supply portion,
wherein the driving portion drives the switching element by supplying a driving current to a control terminal of the switching element,
wherein the current supply portion supplies the driving current to the driving portion, and
wherein the turn-on restriction section decreases the driving current output from the current supply portion to perform the restriction operation.

3. The electronic control device according to claim 1,
wherein the predetermined time is set depending on a capacitive component connected to the main terminal of the switching element.

4. The electronic control device according to claim 1,
wherein the element in the smoothing circuit connected to the main terminal of the switching element is a diode for rectification.

5. The electronic control device according to claim 4,
wherein the diode for rectification is a Schottky barrier diode.

6. The electronic control device according to claim 1,
wherein the switching element is disposed on a power supply path from the direct-current power source to the control processor,
wherein the smoothing circuit includes an inductor, and
wherein one terminal of the inductor is connected to the main terminal of the switching element.

7. The electronic control device according to claim 1, further comprising
an inductor disposed on a power supply path from the direct-current power source to the control processor,
wherein the switching element is connected between the inductor and a reference power supply line.

8. The electronic control device according to claim 4,
wherein the threshold voltage is set based on characteristics of the diode.

\* \* \* \* \*